United States Patent Office 3,311,715
Patented Mar. 28, 1967

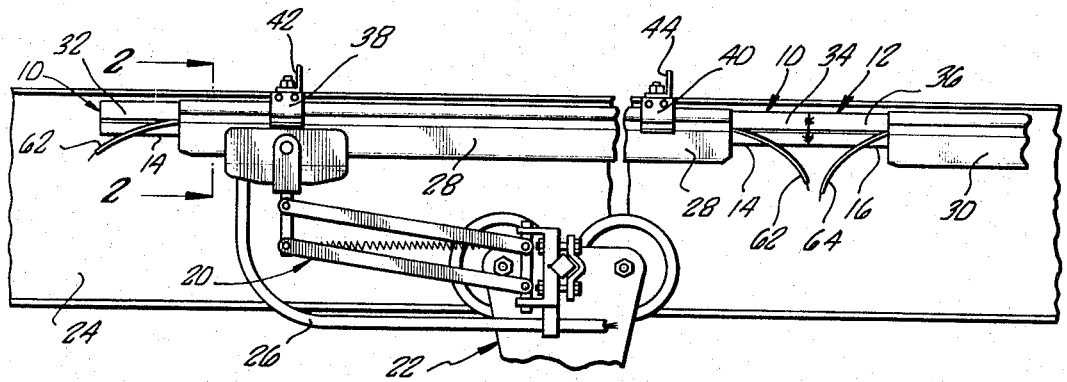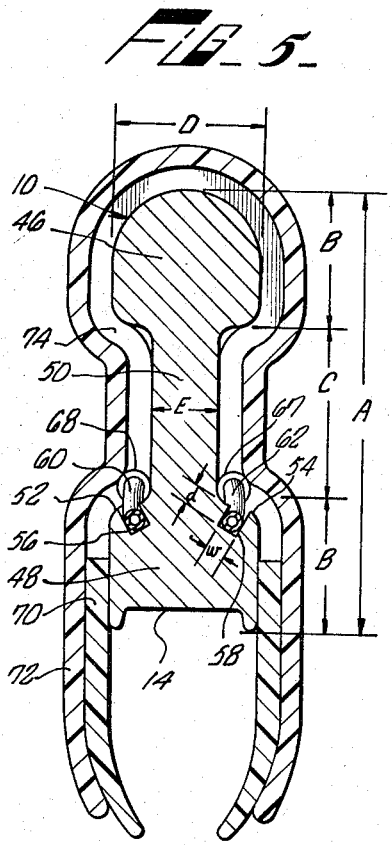

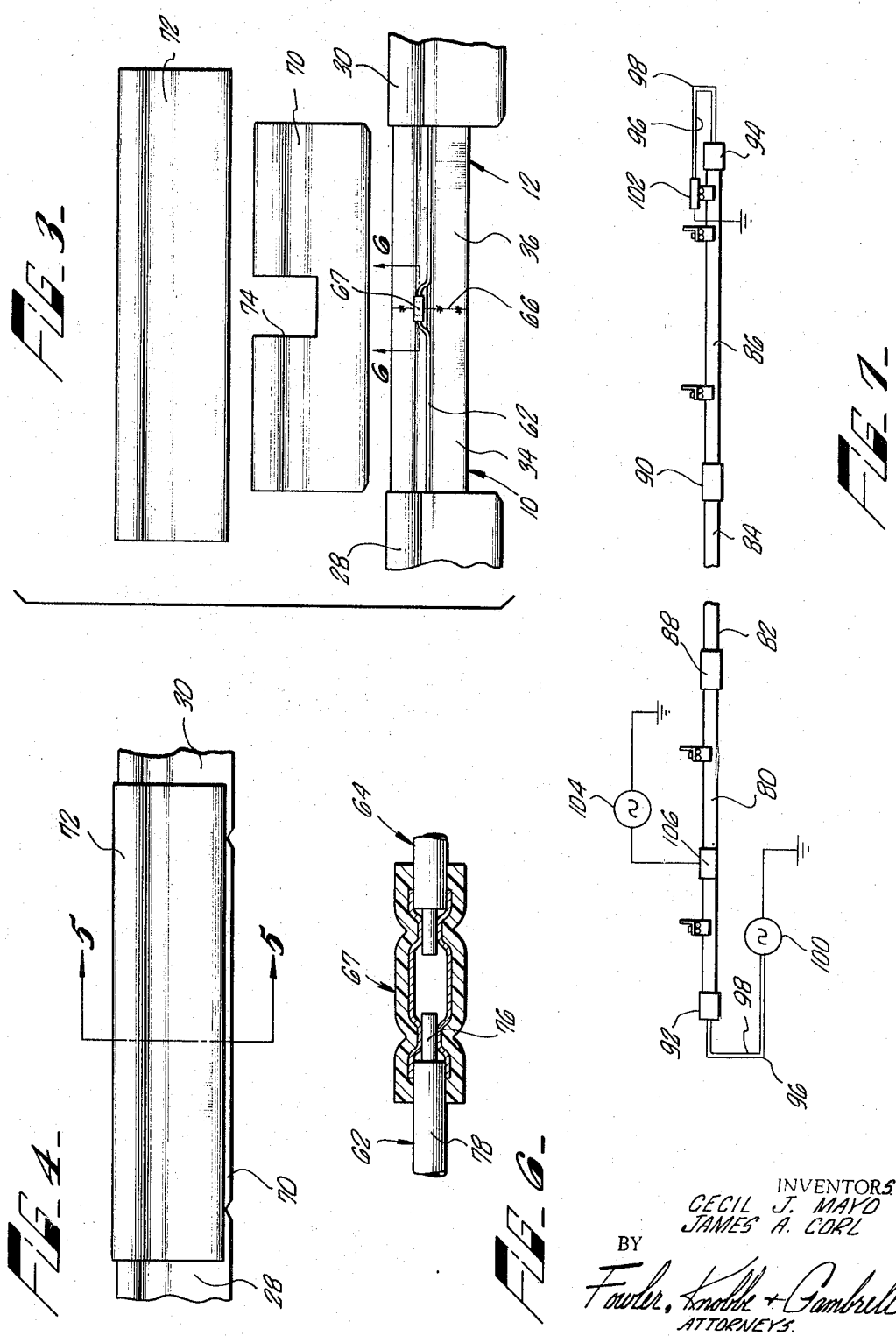

3,311,715
HEATED TROLLEY CONDUCTOR SYSTEM
James A. Corl, San Carlos, and Cecil J. Mayo, Hillsborough, Calif., assignors to Insul-8-Corp., San Carlos, Calif., a corporation of California
Filed Feb. 10, 1965, Ser. No. 431,540
5 Claims. (Cl. 191—27)

This invention relates to trolley conductor systems wherein current collectors are moved along in engagement with the contact surface of electrical conductor bars in order to supply electrical power to mobile machines. The invention has specific reference to the provision of a heated trolley conductor bar system, which inhibits the formation of ice along the contact surface of the conductor bars under freezing weather conditions.

The formation of ice along the contact surface of a conductor bar can interfere with the proper operation of an electrification system in several ways. It can result in the derailing of the collector from the bar, the freezing of the collector to the bar with consequent damage when an attempt is made to move the collector relative to the bar, and in poor and interrupted electrical contact between the collector and the bar.

It is the object of the present invention to solve this problem in an economically practical manner not only for conductor bars generally, but also and especially for heavy trolley conductor systems which may utilize conductor bars of said metal and of considerable cross-sectional size in order to carry currents of 500, 1,000 or more amperes.

In accordance with the present invention, an elongated conductor bar has a contact surface extending along the bottom thereof for engagement by a current collector. The conductor bar has a pair of open external slots which extend longitudinally of the bar respectively adjacent opposite sides thereof. A pair of electrical heater wires each having an electrically insulative covering are respectively disposed in the external slots. An elongated insulating sheath is engaged over the conductor bar so as to substantially cover the top and sides thereof while leaving the contact surface accessible. The sheath covers the external slots so as to physically confine the heater wires therein.

Also in accordance with the present invention, a preferred conductor bar system includes at least two such elongated similar conductor bars joined end-to-end in longitudinal alignment. The insulating sheaths terminate short of the adjacent ends of the bars, so as to leave end portions of the bars exposed. The heater wires for each bar have ends which extend beyond their respective sheaths and out of the slots adjacent the juncture of the bars. Two insulated electrical connectors are disposed outside of the slots respectively adjacent opposite sides of the bar, and connect the ends of the corresponding heater wires of the adjacent bars so as to provide in effect a pair of heater wires extending the length of both bars. A relatively short insulating sheath structure is engaged over the exposed adjacent end portions of the bars. The relatively short sheath structure has interior walls spaced from the bars in the vicinity of the juncture of the bars so as to accommodate the electrical connectors.

By utilizing a thermostat to close a circuit which electrically energizes the heater wires when the temperature drops below freezing, the contact surface of the conductor bars will be maintained at a temperature which is above freezing so as to prevent the formation of ice thereon.

In the preferred embodiment of the invention, the individual conductor bar has a cross-sectional configuration which is elongated from top to bottom and which includes relatively wide upper and lower portions interconnected by a relatively thin web portion, with the contact surface of the bar extending along the bottom of the lower portion. The lower portion has a pair of shoulders extending outwardly and facing upwardly on opposite sides of the web portion, and the pair of shoulders each have an upwardly facing slot formed therein and extending therealong. The width of the slots approximately matches the external diameter of the insulated heater wires which are disposed in them, and the depth of the slots equals or exceeds the external diameter of the insulated heater wires, so that the insulated heater wires have an intimate surrounding physical contact with the conductor bar.

Referring now to the accompanying drawings:
FIG. 1 is a fragmentary elevation of an electrical current collector in contact with a preferred embodiment of the heated conductor bar system of the invention; the latter is illustrated as in the process of being assembled and mounted to supports spaced along a rail;
FIG. 2 is a fragmentary sectional elevation taken along line 2—2 of FIG. 1;
FIG. 3 is an exploded side view illustrating the joining of adjacent conductor bars in longitudinal alignment and showing the relatively short sheath structure for covering the exposed adjacent ends of the joined conductor bars;
FIG. 4 is a side view of the structure illustrated in FIG. 3 after it is assembled;
FIG. 5 is a sectional view taken along line 5—5 of FIG. 4;
FIG. 6 is a fragmentary view partially in section of an electrical connector joining the free ends of corresponding heater wires from the adjacent conductor bars; and,
FIG. 7 is a schematic diagram illustrating the circuit of a headed conductor bar system in accordance with the invention, including a thermostat control and power supply.

Referring now to the drawings, a trolley conductor system includes a plurality of electrical conductor bars 10, 12 joined together end-to-end in longitudinal alignment, as by welding. Each conductor bar 10, 12 has an exposed downwardly facing contact surface 14, 16 respectively. The aligned contact surfaces 14, 16 are adapted to be engaged by the conductive contact shoe 18 of an electrical collector assembly 20 mounted on a carriage 22 which is movable along the rail 24 to which the conductor bars are mounted. A flexible electrical cable 26 runs from the contact shoe 18 of the collector to the carriage 22, for supplying power from the conductor bars to an electric hoist (not shown) mounted on the carriage.

Each conductor bar 10, 12 is substantially covered by a U-shaped insulating sheath 28, 30 respectively. The insulating sheaths are of substantially rigid polyvinyl chloride plastic material. Typically, the insulating sheath 28 covering the conductor bar 10 covers the top and both sides of the bar by conforming to the shape thereof, but leaves the contact surface 14 of the bar accessible to the collector shoe 18. The conductor bars 10, 12 come in standard lenghts of 10 feet, 20 feet, or 30 feet and the insulating sheaths 28, 30 are elongated accordingly. However, each insulating sheath 28, 30 terminates at a position spaced from the respective ends of each bar so as to leave opposite end portions of each bar exposed for about six inches; for example, the exposed end portions 32, 34 of the conductor bar 10 and the exposed end portion 36 of the conductor bar 12. This leaves sufficient exposed working space for the conductor bars to be joined end-to-end in longitudinal alignment as by welding and exposes the heater wire ends of adjacent bars so that they may be joined.

Each conductor bar is suspended from the rail 24 by means of hanger clamps 38, 40 mounted on supporting brackets 42, 44 secured to the rail at spaced locations along its length.

As best seen in FIGS. 2 and 5, the conductor bar 10 has a solid cross-sectional configuration which is elongated from top to bottom and which includes relatively wide upper and lower portions 46, 48 connected by a relatively thin web portion 50, with the contact surface 14 extending along the bottom of the lower portion 48.

The lower portion 48 has a pair of surfaces or shoulders 52, 54 extending outwardly and facing upwardly on opposite sides of the web portion 50. The pair of shoulders 52, 54 have rectangular slots 56, 58 respectively formed therein and extending therealong. Two electrically insulated heater wires 60, 62 are respectively disposed in and along the slits 56, 58.

The heater wires 60, 62 are pressed into slots 56, 58 in the conductor bar 10, and may be held therein with spaced dobs of electric insulating putty such as Dux-Seal while the sheath 28 is inserted over the conductor bar 10.

Once the sheath is in place, it covers the open slots, and physically confines the heater wires therein. Retention of the heater wires within the slots is also assured by the fact that the slots face upwardly, so that gravity causes the heater wires to tend to settle into and out of the slots.

The heater wires for each bar extend beyond the respective sheaths and out of the slots adjacent the junction of adjacent bars. Thus, in FIG. 1 the opposite free ends of the heater wire 62 along one side of the conductor bar 10 are readily seen, as is the free end of a heater wire 64 which runs along the corresponding side of the adjacent conductor bar 12. As illustrated in FIGS. 3 to 6, once adjacent bars 10, 12 have been welded together at the junction 66 of their respective exposed end portions 34, 36, the respective free ends of the corresponding heater wires 62, 64 are joined together by crimping them in opposite ends of a conventional insulated electrical connector 62. As seen in FIG. 5, a second electrical connector 68 connects the exposed end of the heater wire 60 to that of its corresponding heater wire (not shown) for the bar 12. Both connectors 66, 68 are disposed exteriorly of the slots in the bars, with the heater wires extending out of their respective slots adjacent the juncture of the bars.

With the connectors in place, a relatively short insulating sheath structure is engaged over the exposed adjacent end portions 34, 36 of the bars. This relatively short insulating sheath structure includes an interior sheath 70 which matches and fits between the ends of the bar sheaths 28 and 30, and a larger covering sheath 72 which fits over the interior sheath and overlaps the ends of the bar sheaths 28, 30. The interior sheath 70 has a large rectangular notch 74 cut out of its top and side walls. Except for this notch portion 74, which extends slightly below the position of the slots in the bar, the interior sheath 70 being similar to the bar sheaths physically confines the heater wires to the slots. The large rectangular notch 74 provides a spacing of the composite interior wall of the combined relatively short sheath structure 70, 72 away from the bars in the vicinity of the juncture of the bars, so as to accommodate the electrical connectors 67, 68.

As best illustrated in the enlarged view of FIG. 6, a typical heater wire 62 is a metal alloy wire 76 having an insulative coating 78; for example, irradiated polyolefin which may be extruded directly onto the wire. The wire is an alloy of metals including copper and nickel, and is commercially available for heating purposes in various sizes and electrical resistance values. For example, it is available under the brand name "Tophet-C" from Wilbur G. Driver Company, Los Angeles, Calif.

As best seen in FIG. 5, the width $w$ of a typical slot 58 approximately matches the external diameter of the typical heater wire 62; and, the depth $d$ of the slot equals or exceeds the external diameter of the insulated heater wire. Thus, the heater wire resides entirely within the slot and has an intimate surrounding contact with the conductor bar. This arrangement is very effective in transferring heat to the contact face 14 of the conductor bar, especially since the slots are covered by the insulating sheath 28. Also, since the heater wire resides within the surface confines of the conductor bar, it is possible to mill appropriate slots in existing solid conductor bars and with no further modification to the conductor bar or to its sheath, a heater system is thereby afforded.

The problem of course is to heat the contact surface 14 of the conductor bar without interfering with the essential functions of the various components of the system. Since it is the contact surface 14 of the bar that needs heating, the slots 52, 54 are disposed near the lower end of the elongated cross-sectional configuration; namely in the shoulders of the bottom portion 48 of the bar. The use of two heater wires disposed on opposite sides of the bar provides double the heating capability as would be provided by a single heater wire, provides a better distribution of heat sources across the contact face 14, and facilitates operating the heater wires effectively at low temperatures which are less harmful to the insulating materials in contact with them.

In order to keep the contact surface 14 of the conductor bar free from ice, the surface should be kept at a minimum temperature of about 35 degrees Fahrenheit under freezing weather conditions. This however is no longer necessary when the ambient temperature drops below about 10 degrees Fahrenheit because at these temperatures there is little or no moisture in the air. Hence, the heating system need only have the capacity to heat the contact surface 14 to approximately 25 to 30 degrees Fahrenheit above the ambient temperature.

An example of typical operation will be explained with reference to FIGS. 5 and 7. As seen in FIG. 5, a typical conductor bar 10 is made of solid aluminum. Its elongated cross-sectional configuration has an overall height A of about 2½ inches, with the height B of its upper and lower portions 46, 48 being about ¾-inch each, and with the width D of the upper and lower portions each being about ⅞-inch. The connecting web portion 50 has a height C of about 1 inch and a width E of about ⅜-inch. The typical slot 58 has a width $w$ of $\frac{3}{32}$-inch and a depth $d$ of ⅛-inch. The insulated heater wire is "Tophet-C," and its outer diameter including its insulative covering is $\frac{3}{32}$-inch.

Considering the arrangement shown in FIG. 5 with the dimensions given, I have found that about 5 watts per foot dissipated by each of the two heater wires 60, 62 suffices to maintain the contact surface 25 to 30 degrees above ambient. The conductor bar 10 might be carrying as much as 1000 amperes at 480 volts A.C. and the heater wires 60, 62 may be energized at the same or a different voltage with the resistance per unit length chosen to dissipate 5 watts per foot each, or a total of 10 watts per foot of bar from both heater wires.

FIG. 7 schematically illustrates a complete run of conductor bars. A plurality of insulated conductor bars 80, 82, 84, 86 are joined in end-to-end longitudinal alignment with relatively short sheath structures 88, 90 covering the exposed junctures between successive bars. A run may be several hundred feet long involving a large number of conductor bars connected end-to-end. Simple end caps 92, 94 of polyvinyl chloride plastic material fit over opposite ends of the run of conductor bars, and two connected series of heater wires 96, 98 run from a power source 100 through the first end cap 92, along the run of conductor bars, out the second end cap 94, and to a thermostat switch 102. When the temperature falls below freezing, the thermostat switch closes, thus closing the circuit from the thermostat to the power supply 100, whereby the heater wire circuits 96, 98 are electrically energized in parallel.

Power to the conductor bars may be supplied separately by a power source 104 through a conventional insulated power feed connection 106 directly coupled to one of the conductor bars.

We claim:

1. An elongated conductor bar having a contact surface extending along the bottom thereof for engagement by a current collector, the conductor bar having a pair of open external slots extending longitudinally of the bar respectively adjacent opposite sides thereof, a pair of electrical heater wires each having an electrically insulative covering and respectively disposed in said external slots, and an elongated insulating sheath engaged over said conductor bar so as to substantially cover the top and sides thereof while leaving said contact surface accessible, the insulating sheath covering said external slots so as to physically confine the heater wires therein.

2. The conductor bar of claim 1 wherein the width of the slots approximately matches the external diameter of the insulated heater wires and wherein the depth of the slots equals or exceeds the external diameter of the insulated heater wires, so that the insulated heater wires have an intimate surrounding physical contact with the conductor bar.

3. An elongated solid conductor bar having a downwardly facing contact surface extending along the bottom thereof for engagement by a current collector, the conductor bar having upwardly facing surfaces extending longitudinally adjacent opposite sides thereof, means defining a pair of external slots extending respectively along said upwardly facing surfaces adjacent opposite sides of the bar, a pair of electrical heater wires each having an electrically insulative covering and respectively disposed in said external slots, and an elongated insulating sheath engaged over said conductor bar and leaving said contact surface exposed, the insulating sheath overlying said external slots so as to confine the heater wires therein.

4. An elongated solid conductor bar having a contact surface extending along the bottom thereof for engagement by a current collector, the bar having a cross-sectional configuration which is elongated from top to bottom and which includes relatively wide upper and lower portions connected by a relatively thin web portion, with said contact surface extending along the bottom of the lower portion, the lower portion having a pair of shoulders extending outwardly and facing upwardly on opposite sides of the web portion, the pair of shoulders each having a slot formed therein and extending therealong, a pair of electrical heater wires each having an electrically insulative covering and respectively disposed in and along said slots, and an electrically insulative sheath engaged over said conductor bar and leaving the contact surface thereof exposed, said sheath overlying the slots so as to confine the heater wires therein.

5. A conductor bar system wherein at least two elongated similar conductor bars are joined end to end in longitudinal alignment with an exposed downwardly facing contact surface extending along the bottom of each bar for engagement by a current collector, each conductor bar having a pair of upwardly facing external slots extending longitudinally adjacent opposite sides of the conductor bar and also having a pair of electrically insulated heater wires respectively disposed in said pair of slots and an elongated insulating sheath engaged over the conductor bar and overlying the external slots so as to confine the heater wires therein, said insulating sheaths terminating short of the adjacent ends of the bars so as to leave end portions of the bars exposed, said pair of heater wires for each bar having ends which extend beyond the respective sheaths and out of the slots adjacent the juncture of the bars, a pair of insulated electrical connectors disposed exteriorly of said slots and connecting the ends of the corresponding heater wires of the adjacent bars so as to provide in effect a pair of heater wires extending the length of both bars, and a relatively short insulating sheath structure engaged over the exposed adjacent end portions of the bars, the relatively short sheath structure having interior walls spaced from the bars in the vicinity of the juncture of the bars so as to accommodate the electrical connectors.

References Cited by the Examiner

UNITED STATES PATENTS

| 557,258 | 3/1896 | Delany | 191—27 |
| 2,870,311 | 1/1959 | Greenfield et al. | 191—27 XR |

FOREIGN PATENTS

| 1,028,607 | 10/1958 | Germany. |
| 543,331 | 2/1942 | Great Britain. |

ARTHUR L. LA POINT, *Primary Examiner.*

S. T. KRAWCZEWICZ, *Assistant Examiner.*